United States Patent
Kizhakkemadam et al.

(10) Patent No.: US 9,900,808 B2
(45) Date of Patent: Feb. 20, 2018

(54) METHOD AND SYSTEM FOR CONTROLLING TRANSMISSION OF CODE WORDS DURING HANDOVER IN A WIRELESS NETWORK

(71) Applicant: Samsung Electronics Co., Ltd, Suwon-si (KR)

(72) Inventors: Sriram N. Kizhakkemadam, Bangalore (IN); Shrinath Ramamoorthy, Bangalore (IN); Anil Agiwal, Bangalore (IN)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 93 days.

(21) Appl. No.: 14/954,571

(22) Filed: Nov. 30, 2015

(65) Prior Publication Data

US 2016/0157139 A1    Jun. 2, 2016

(30) Foreign Application Priority Data

Nov. 28, 2014  (IN) .......................... 5974/CHE/2014
Apr. 8, 2015   (KR) ........................ 10-2015-0049917

(51) Int. Cl.
  *H04W 36/00*    (2009.01)
  *H04B 17/309*   (2015.01)
  (Continued)

(52) U.S. Cl.
  CPC ........ *H04W 36/0044* (2013.01); *H04B 7/022* (2013.01); *H04B 7/0689* (2013.01);
  (Continued)

(58) Field of Classification Search
  CPC .... H04B 7/022; H04B 7/0689; H04B 17/309; H04L 1/0009; H04L 5/0035; H04W 36/026; H04W 36/30; H04W 36/0044
  See application file for complete search history.

(56) References Cited

U.S. PATENT DOCUMENTS

| | | | |
|---|---|---|---|
| 8,953,465 B2* | 2/2015 | Aguirre | H04W 72/048 370/252 |
| 2011/0085460 A1* | 4/2011 | Zhang | H04W 56/005 370/252 |

(Continued)

FOREIGN PATENT DOCUMENTS

| | | |
|---|---|---|
| EP | 2389026 A1 | 11/2011 |
| WO | 2014019106 A1 | 2/2014 |
| WO | WO 2014/019106 A1 | 2/2014 |

OTHER PUBLICATIONS

International Search Report dated Jan. 29, 2016 in connection with International Application PCT/KR2015/008669, 3 pages.

(Continued)

*Primary Examiner* — Benjamin H Elliott, IV (57) ABSTRACT

The present disclosure relates to a pre-5th-Generation (5G) or 5G communication system to be provided for supporting higher data rates beyond 4G system. A method for controlling transmission of code words during handover including a plurality of BSs includes receiving an SINR associated with a UE served by any one of the BS, wherein the UE is associated with a plurality of coordinated transmission modes indicating whether the UE receives a complete code word from the BSs or a partial code word from the BSs or a combination of the complete code word from some of the BSs and the partial code word from other set of BSs based on a coordinated transmission threshold criteria. Further, the method includes determining whether the SINR meets the coordinated transmission threshold criteria to select the coordinated transmission mode for transmission of the code word from the BSs to the UE.

20 Claims, 6 Drawing Sheets

(51) Int. Cl.
  *H04L 1/00*    (2006.01)
  *H04L 5/00*    (2006.01)
  *H04B 7/022*   (2017.01)
  *H04B 7/06*    (2006.01)
  *H04W 36/02*   (2009.01)
  *H04W 36/30*   (2009.01)

(52) U.S. Cl.
  CPC ......... *H04B 17/309* (2015.01); *H04L 1/0009* (2013.01); *H04L 5/0035* (2013.01); *H04W 36/026* (2013.01); *H04W 36/30* (2013.01)

(56) References Cited

U.S. PATENT DOCUMENTS

| | | |
|---|---|---|
| 2011/0310786 A1 | 12/2011 | Qin et al. |
| 2012/0189077 A1* | 7/2012 | Seo .................. H04B 7/024 |
| | | 375/267 |
| 2013/0017825 A1 | 1/2013 | Li et al. |
| 2013/0039349 A1 | 2/2013 | Ebrahimi Tazeh Mahalleh et al. |
| 2013/0094604 A1 | 4/2013 | Mondal et al. |
| 2013/0201896 A1 | 8/2013 | Ono et al. |
| 2014/0036881 A1 | 2/2014 | Kim et al. |
| 2014/0133317 A1* | 5/2014 | Chen .................... H04B 7/0689 |
| | | 370/252 |
| 2014/0241307 A1* | 8/2014 | Liu ...................... H04B 7/0617 |
| | | 370/329 |
| 2015/0189636 A1 | 7/2015 | Liu et al. |
| 2016/0157139 A1* | 6/2016 | Kizhakkemadam ... H04B 7/022 |
| | | 370/332 |

OTHER PUBLICATIONS

Written Opinion of the International Searching Authority dated Jan. 29, 2016 in connection with International Application PCT/KR2015/008669, 8 pages.

Foreign Communication from Related Counterpart Application; European Patent Application No. 15863986.4; Extended European Search Report and European Search Opinion dated Oct. 16, 2017; 10 pages.

* cited by examiner

METHOD AND SYSTEM FOR CONTROLLING TRANSMISSION OF CODE WORDS DURING HANDOVER IN A WIRELESS NETWORK

CROSS-REFERENCE TO RELATED APPLICATIONS AND CLAIM OF PRIORITY

The present application is related to and claims the benefit under 35 U.S.C. § 119(a) of an Indian patent application filed on Nov. 28, 2014 in the Intellectual Property of India and assigned Serial number 5974/CHE/2014, a Korean patent application filed on Apr. 8, 2015 in the Korean Intellectual Property Office and assigned Serial number 10-2015-0049917, the entire disclosures of which are hereby incorporated by reference.

TECHNICAL FIELD

The present disclosure generally relates to wireless communication systems and more particularly to a handover of a user equipment (UE) to a plurality of base stations (BSs).

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Figure 1A:
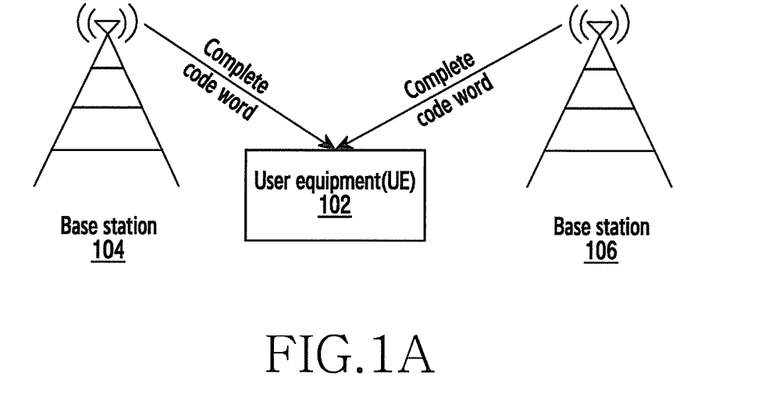
FIGS. 1A and 1B illustrate a handover mechanism in mobile communication systems.

Generally, handover (HO) is an important procedure in a cellular transmission as it enables service continuity within a same radio access technology (RAT) or across different RATs. In existing systems, a hard HO and a soft HO are available for a UE to switch from a source base station to a target base station; thereby, maintaining the continuity of service. In soft HO, the UE receives downlink data from multiple BS while the HO procedure is being followed i.e., during the time of HO; the UE has the radio link with both the source base station and the target base station. If the UE is connected to two (or multiple) BSs during the HO then the UE will receive complete code word from the source and target base station as indicated in FIG. 1A.

Figure 1B:
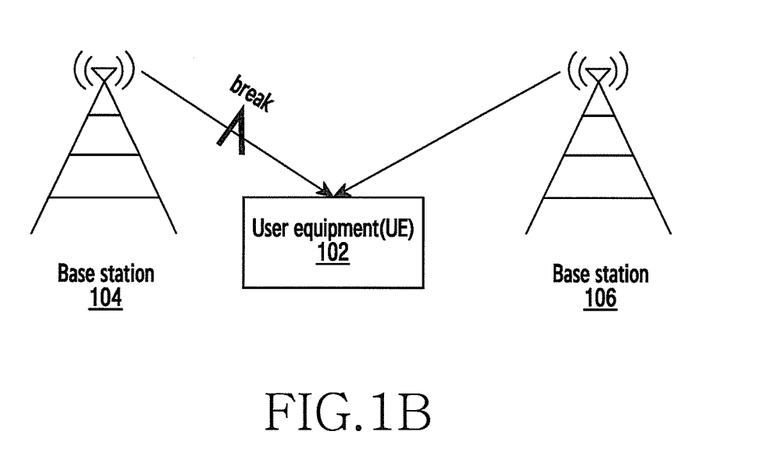

In hard HO, the UE has to break the radio link with the source base station before the new radio link can be established with the target base station i.e., at any point of time the UE has the radio link with only one base station as indicated in FIG. 1B. In the hard HO, particularly in Global System for Mobile Communications (GSM), Long Term Evolution (LTE) and inter-frequency HO in Code division multiple access (CDMA) based technologies, when the UE meets the HO condition then the UE will transmit measurement reports of a signal strength of the neighbor BS whose signal strength is improving when compared to the source BS. Based on the reports, the source BS will provide the radio link details of the target BS to the UE. The UE will break the link with the source BS and establish the new link with the target BS. The hard HO of Long Term Evolution (LTE) is one of the causes for ping-pong effect that leads to an overhead in signaling. To mitigate ping-pong effect, one possible solution is to have a joint transmission during HO. The joint transmission of a complete code word from the serving and target base stations during the HO will increase the usage of scarce spectrum resources and decrease the overall cell spectral efficiency.

The joint processing from the multiple BSs can be in the form of dynamic point switching (DPS); wherein, only one BS can transmit to the UE at a given time instant or joint transmission (JT); wherein, all the BSs in the transmission set transmit the same data to the UE simultaneously. In both the modes of transmissions, data packet for the UE is available at all the BSs in the transmitting set. The JT is more attractive in light of the link fragility in mm-wave systems. Due to the link fragility, soft handover will be preferred in comparison to hard handover. In currently known soft handover schemes, complete data is transmitted by a plurality of BSs that participate in the HO procedure. Thus, there is an overhead both during transmission of data as well as during HO. Considering the link fragility of mm-wave systems and the necessity for small cells, the number of handovers will increase. Consequently, due to the overhead during handover and increased number of handovers, the system throughput will decrease significantly.

The above information is presented as background information only to help the reader to understand the present disclosure. Applicants have made no determination and make no assertion as to whether any of the above might be applicable as Prior Art with regard to the present application.

SUMMARY

To address the above-discussed deficiencies, it is a primary object to provide a method and system for controlling transmission of code words during handover in a wireless network.

Another object of the embodiments herein is to provide a plurality of coordinated transmission modes indicating whether a user equipment (UE) receives a complete code word from a base station (BS) or a partial code word from a BS or a combination of complete code word from some BS and partial code word from other set of BS based on a coordinated transmission threshold criteria.

Embodiments herein provide a method for controlling transmission of code words during handover or otherwise in a wireless network including a plurality of base stations (BSs). The method includes receiving a signal-to-interference-plus-noise ratio (SINR) associated with a user equipment (UE) served by the BS, wherein the UE is associated with a plurality of coordinated transmission modes indicating whether the UE receives a complete code word from the BS or a partial code word from the BS or a combination of complete code word from one or more BSs and partial code word from other set of BSs based on a coordinated transmission threshold criteria. Further, the method includes determining whether the SINR meets the coordinated transmission threshold criteria to select the coordinated transmission mode for transmission of the code word from the BS to the UE.

Embodiments herein provide a system for controlling transmission of code words during handover or otherwise in a wireless network including a plurality of base stations (BSs), wherein each of the BS includes a controller configured to receive a signal-to-interference-plus-noise ratio (SINR) associated with a user equipment (UE) served by the BS, wherein each of the BS is associated with a plurality of transmission modes indicates whether each of the BS transmit one of a complete code word and a partial code word to the UE based on a coordinated transmission threshold criteria. Further, the controller configured to determine whether the SINR meets the coordinated transmission threshold criteria to select the coordinated transmission mode for transmission of the code word from the BS to the UE.

Herein, the SINR corresponds to an example of channel quality information and another kind of channel quality information such as a carrier to interference plus noise ratio (CINR) can be applied to the SINR.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications can be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts: This disclosure is illustrated in the accompanying drawings, throughout which like reference letters indicate corresponding parts in the various figures. The embodiments herein will be better understood from the following description with reference to the drawings, in which.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein disclose a method and system for controlling transmission of code words for handover or otherwise in a wireless network including a plurality of base stations (BSs). The method includes receiving a signal-to-interference-plus-noise ratio (SINR) associated with a UE served by one or more BSs. The BSs are associated with a plurality of coordinated transmission modes. The coordinated transmission mode indicates whether each of the BS transmits a complete code word or a partial code word to the UE based on transmission threshold criteria. Further, the method includes determining whether the SINR meets the coordinated transmission threshold criteria to select one or more coordinated transmission modes for transmission of the code word from the BSs to the UE. In an embodiment, the coordinated transmission threshold criteria include a time criteria. Herein, the SINR corresponds to an example of channel quality information and another kind of channel quality information such as a carrier to interference plus noise ratio (CINR) can be applied to the SINR.

The method and system described herein is simple and robust for controlling transmission of code words for handover in the wireless network.

Unlike conventional systems, the resources are conserved and the signaling overhead is decreased. The handover is no longer limited to changing the serving BS for the UE. During the handover with joint transmission, the length of the code word transmitted by each of the BS is not same. The handover is similar to the soft handover with the difference being that the length of the code word transmitted by the multiple BSs is not same. For example, if one BS transmits the complete code word and the other BS transmits a function of the code word whose length is less than that of the complete code word; thereby achieving a significant decrease in the DL transmission overhead.

Referring now to the drawings, and more particularly to FIGS. 2 through 5, where similar reference characters denote corresponding features consistently throughout the figures, there are shown preferred embodiments.

Figure 2:
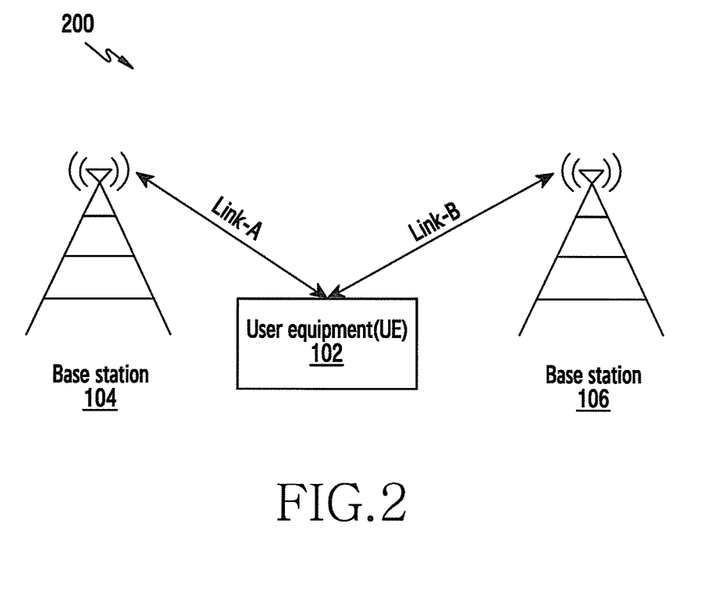
FIG. 2 illustrates a high level overview of a system for controlling transmission of code words to a UE, according to embodiments as disclosed herein.

FIG. 2 illustrates a high level overview of a system 200 for controlling transmission of code words to a UE, according to embodiments as disclosed herein. In an embodiment, the system 200 can be configured to include a UE 102, a base station (BS) 104, and a base station (BS) 106.

The UE 102 described herein can be for example but not limited to a mobile phone, a mobile station, a smart phone, a personal digital assistants (PDAs), a tablet, a phablet, or any other electronic device. The UE 102 can be configured to get served by the BS 104 through a "link-A" and the BS 106 through a "link-B" in the downlink as shown in the FIG. 2.

The BS 104 and BS 106 forms the transmission set for transmitting either complete or partial code words to the UE 102. The BS 104 and BS 106 can send code words to the UE 102 through the "link-A" and "link-B". For the purpose of transmission to the UE 102, the transmission set can have a leader called as master BS (not shown). In an embodiment, the master BS can either be one among the transmission set (i.e. either the BS 104 or the BS 106) or it can be distinct from the BS 104 and the BS 106 in the transmission set. The BS 104 and BS 106 can be configured to be associated with a plurality of coordinated transmission modes. Here, the coordinated transmission modes indicate whether each of the BS 104 and BS 106 should transmit either the complete code word or the partial code word to the UE 102 based on the coordinated transmission threshold criteria. In an embodiment, the master BS can be required in a centralized scheduling for the UE 102. In another embodiment, if a distributed scheduling is used then the master BS can be optional.

The BS 104 and the BS 106 can be configured to receive the information regarding the SINR and other measurements data of the UE 102 through the centralized or distributed mechanism. For example, in the centralized mechanism, the information can be made available to either of the BS 104 and the BS 106. Further, the BS 104 or the BS 106 can be configured to receive the SINR associated with the UE 102. Further, the BS 104 or the BS 106 can be configured to determine whether the SINR meets the coordinated transmission threshold criteria to select the coordinated transmission mode for the transmission of the code words from the BS 104 and the BS 106 to the UE 102. For example, in the coordinated transmission mode either BS 104 or the BS 106 can transmit a function of the partial code word or even the partial information corresponding to the function of a code word. In another coordinated transmission mode, either BS 104 or the BS 106 can transmit the complete code word to the UE 102. For example, consider a scenario wherein 2 BSs (i.e. a first BS and a second BS) can serve the UE 102 either singly or jointly. The set of possible coordinated transmission modes are as follows:

Only either of the first BS or the second BS transmits the complete code word to the UE 102.

Both the first BS and the second BS transmits the complete code word to the UE 102.

The first BS transmits the complete code word while the second BS transmits either partial code word or even the function of the original code word with the code word length being less than or equal to that transmitted by the first BS.

Both the first BS and the second BS transmit only the partial code word. Again the partial code word can be part of the original code word or a function of the original code word with the length of the partial code word being strictly less than that of the complete code word.

Further, the UE 102 can be configured to maintain a set of timer values and radio link failure (RLF) counters at the BS for the handover based on the selected coordinated transmission mode. The timer values to be satisfied for the UE 102 to transition from one coordinated transmission mode to the another coordinated transmission mode are disclosed below:

$S_{12}$: $t_{11}$ for all the BS that will transmit partial code word, $t_{12}$ for all the BS that will transmit complete code word $S_{13}$: $t_2$ $S_{14}$: $t_3$ $S_{21}$: $t_4$ $S_{23}$: $t_5$ $S_{24}$: $t_6$ $S_{31}$: $t_7$ $S_{32}$: $t_{81}$ for all the BS that will transmit partial code word, $t_{82}$ for all the BS that transmit complete code word $S_{34}$: $t_9$ The FIG. 2 show a limited overview of the system 200 but, it is to be understood that another embodiment is not limited thereto. Further, the system 200 can include different BSs communicating among each other along with other hardware or software components.

Figure 3:
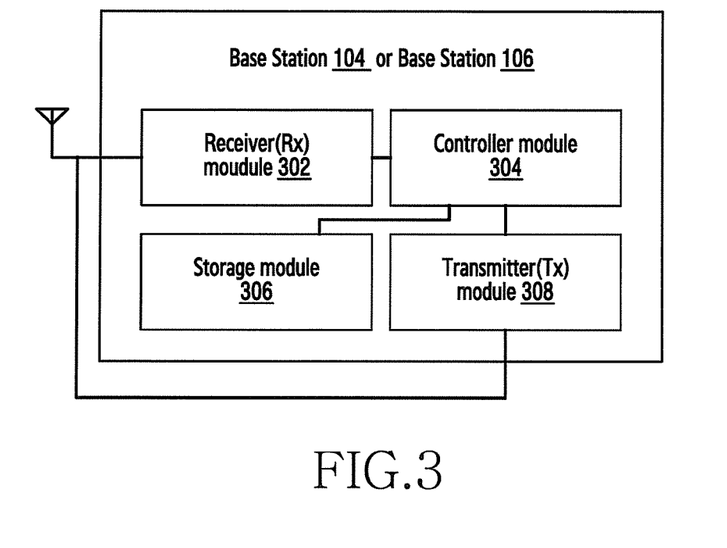
FIG. 3 illustrates various modules in a BS 104 or a BS 106, according to embodiments as disclosed herein.

FIG. 3 illustrates various modules in a BS 104 or a BS 106, according to embodiments as disclosed herein. In an embodiment, the BS 104 or BS 106 can be configured to include a receiver (Rx) module 302, a controller module 304, a storage module 306, and a transmitter (Tx) module 308.

The Rx module 302 can be configured to receive the SINR associated with the UE 102 served by the BS 104 or the BS 106. In an embodiment, the UE 102 is associated with one or more coordinated transmission modes indicating whether the UE 102 receives a complete code word from the BS, or a combination of complete code word from some BS and partial code word from other set of BS based on a coordinated transmission threshold criteria. Further, the Rx module 302 can be configured to send the received SINR associated with the UE 102 to the controller module 304. On receiving the SINR, the controller module 304 can be configured to determine whether the SINR meets the coordinated transmission threshold criteria to select the coordinated transmission mode for transmission of the code words from the BS 104 or the BS 106 to the UE 102.

In an embodiment, determining whether the SINR meets the coordinated transmission threshold criteria to select the coordinated transmission mode for reception of the code word from the BS 104 or the BS 106 to the UE 102 includes determining whether the SINR is within the first coordinated transmission threshold by the controller module 304 where the first coordinated transmission threshold is associated with a first coordinated transmission mode from the one or more coordinated transmission modes. The first coordinated transmission mode is selected in after determining that the SINR is within the first coordinated transmission threshold and the first coordinated transmission mode allows the BS 104 and the BS 106 to transmit the complete code word to the UE 102.

In another embodiment, if the controller module 304 determines whether the SINR is within a second coordinated transmission threshold criteria after determining that the SINR exceeds the first coordinated transmission threshold where the second coordinated transmission threshold is associated with a second coordinated transmission mode from the plurality of coordinated transmission modes. The second coordinated transmission mode is selected after determining that the SINR is within the second coordinated transmission threshold and the second coordinated transmission mode allows BS 104 or the BS 106 to transmit the complete code word to the UE 102 and BS 104 or the BS 106 to transmit the partial code word to the UE 102.

In another embodiment, if the controller module 304 determines the SINR is within a third coordinated transmission threshold after determining that the SINR exceeds the second coordinated transmission threshold where the third coordinated transmission threshold is associated with a third coordinated transmission mode from the plurality of coordinated transmission modes. The third coordinated transmission mode is selected after determining that the SINR is within the third coordinated transmission threshold where the third coordinated transmission mode allows the BS 104 and the BS 106 to transmit the partial code word to the UE 102.

In another embodiment, the controller module 304 can be configured to select a fourth coordinated transmission mode after determining that the SINR exceeds the third coordinated transmission threshold where the fourth coordinated transmission mode allows only BS 104 or BS 106 to transmit the complete code word to the UE 102.

The storage module 306 can be configured to store coordinated transmission threshold criteria for each coordinated transmission mode. The storage module 306 can be configured to store control instructions to perform various operation. The Tx module 308 can be configured to transfer the complete or partial code words to the UE 102 based on the determined coordinated transmission mode.

The FIG. 3 show a limited overview of the BS 104 or the BS 106 but, it is to be understood that other embodiment is not limited thereto. Further, the BS 104 or the BS 106 can include any number of modules communicating among each other along with the other components of the system 200.

Figure 4:
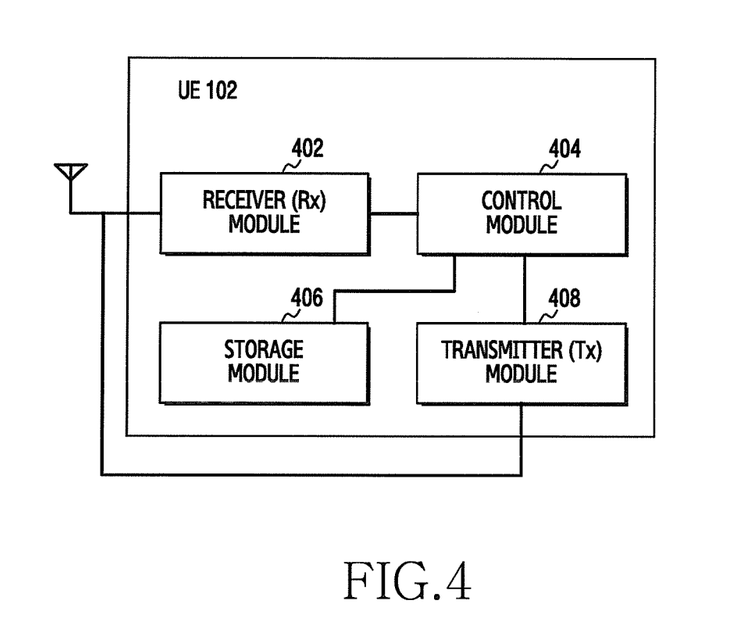
FIG. 4 illustrates various modules in a UE 102 according to an embodiment of the present disclosure.

According to the described embodiment, FIG. 4 illustrates various modules in a UE 102. In the embodiment, the UE 102 can include an receiver (Rx) module 402, a controller module 404, a storage module 406, and a transmitter (Tx) module 408.

The Rx module 402 receives a signal transmitted from another device. For example, the Rx module 402 can be configured to receive a complete code word or a partial code word according to a coordinated transmission mode from the BS 104 or the BS 106 in the UE 102. The controller module 404 controls overall functions of the UE 102. For example, the controller module 404 can receive and transmit a signal by controlling the Rx module 402 and the Tx module 408.

Further, the controller module 404 can store data in the storage module 406 and read the stored data. The storage module 406 is configured to store a control command for performing various operations. The Tx module 408 is configured to transmit the SINR to the BS 104 or the BS 106.

In the embodiment, the UE 102 is associated with one or more coordinated transmission mode representing whether the UE 102 receives a complete code word from the BS, whether the UE 102 receives a combination of the complete code word from one BS, and whether the UE 102 receives a partial code word from another BS set on the basis of a coordinated transmission threshold criteria.

FIG. 4 illustrates a limited overview of the UE 102. However, this should not be understood as a limitation of the embodiment. Also, the UE 102 can include a predetermined module which communicates with another element of the system 200.

Figure 5:
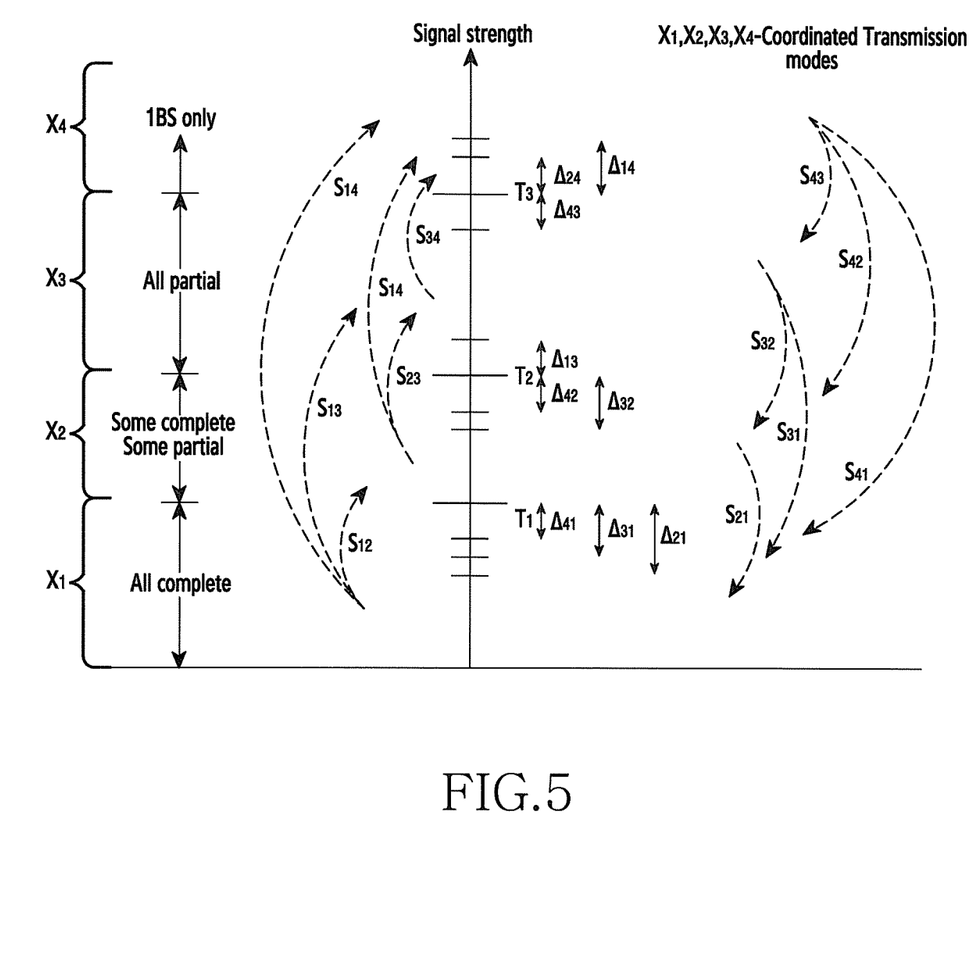
FIG. 5 illustrates an example scenario of state transition for controlling transmission of code words to a UE during one or more coordinated transmission modes, according to embodiments as disclosed herein.

FIG. 5 illustrates an example scenario of state transition for controlling transmission of code words to a UE during one or more coordinated transmission modes, according to embodiments as disclosed herein. In an embodiment, the different coordinated transmission modes during the handover procedure are described below as shown in the FIG. 4. The Y-axis represents increase in signal strength value. Here, X1, X2, X3, and X4 are the four coordinated transmission modes. Where:

X1: Transmission of complete code word by all BSs for the UE;

X2: Transmission of partial code word by some BSs and complete code word by the rest of the BSs for the UE;

X3: Transmission of partial code word by all BSs for the UE; and

X4: Transmission of complete code word by only one BS in for the UE.

Also, T1, T2, and T3 are the coordinated transmission threshold criteria's and delta is related to a bias value of a specific state. If the signal strength is very low then the BS 104 and the BS 106 will transmit the complete code word to the UE 102. For example, if the SINR of the UE 102 is within the first coordinated transmission threshold "T1" where the first coordinated transmission threshold "T1" is associated with the first coordinated transmission mode "X1", then the first coordinated transmission mode "X1" is selected which allows the BS 104 and BS 106 to transmit the complete code word to the UE 102. Further, if the signal strength increases to the second coordinated transmission threshold "T2" exceeding the first coordinated transmission threshold "T1" (i.e., the SINR of the UE 102 is within a second coordinated transmission threshold "T2") after determining that the SINR exceeds the first coordinated transmission threshold "T1" then the second coordinated transmission mode "X2" is selected allowing either the BS 104 or the BS 106 to transmit the complete code word to the UE 102 and allows either the BS 104 or the BS 106 to transmit the partial code word to the UE 102. For example, in the second coordinated transmission mode "X2", the BS 104 can transmit the complete code word to the UE 102 and the BS 106 can transmit the partial code word to the UE 102. In another example, in the second coordinated transmission mode "X2", the BS 104 can transmit the partial code word to the UE 102 and the BS 106 can transmit the complete code word to the UE 102.

If the signal strength increases to the third coordinated transmission threshold "T3" exceeding the second coordinated transmission threshold "T2" (i.e., the SINR of the UE 102 is within the third coordinated transmission threshold "T3") after determining that the SINR exceeds the second coordinated transmission threshold "T2" then the third coordinated transmission mode "X3" is selected allowing the BS 104 and the BS 106 to transmit the partial code word to the UE 102. Further, if the signal strength exceeds the third receive threshold "T3" (i.e., the SINR of the UE 102 exceeds the third coordinated transmission threshold "T3"), then the fourth coordinated transmission mode "X4" is selected allowing only the BS 104 or the BS 106 to transmit the complete code word to the UE 102. For example, in the fourth coordinated transmission mode "X4", only the BS 104 can transmit the complete code word to the UE 102. In another example, in the fourth coordinated transmission mode "X4", only the BS 106 can transmit the complete code word to the UE 102.

In another example, if the SINR of the UE 102 is within the first coordinated transmission threshold "T1" where the first coordinated transmission threshold "T1" is associated with the first coordinated transmission mode "X1", then the first coordinated transmission mode "X1" is selected which allows the BS 104 and the BS 106 to transmit the complete code word to the UE 102. Further, if the signal strength increases to the third coordinated transmission threshold "T3" exceeding the first coordinated transmission threshold "T1" and the second coordinated transmission threshold "T2" (i.e., the SINR of the UE 102 is within a third coordinated transmission threshold "T3") after determining that the SINR exceeds the first coordinated transmission threshold "T1" and the second coordinated transmission threshold "T2" then the third coordinated transmission mode "X3" is selected allowing the BS 104 and the BS 106 to transmit the partial code word to the UE 102.

In an embodiment, the transition of the UE 102 from one coordinated transmission mode to the another coordinated transmission modes depend on the effective received SINR associated with the UE 102 after receiving the complete or partial code words from the BS 104 and the BS 106. The effective received SINR (also called as post-processing SINR) depends on the length of the code word selected for the partial code word transmission and the number of BSs co-operating in the transmission of the code words. The notation SINRi denotes the averaged SINR at the UE from the BSi. For example, SINR1 denotes the averaged SINR at the UE 102 from the BS 104. In another example, SINR2 denotes the averaged SINR at the UE 102 from the BS 106. The method to determine the possible coordinated transmission modes and the length of the code word from each of the BS is disclosed below:

By estimating the length of the code word from each BS (xi) that maximizes a utility function (f) as given below subject to the constraint that the length of each code word from all the BSs should be at least "$l_1$" and the number of BSs transmitting the data from |B| BS is less than "a" and "I" denotes the indicator function $$\hat{x} = \max_{x} f(x, H_i, SINR_i) \quad \text{Equation 1}$$

s.t.

$$x_i \geq l_1$$

$$\sum_{i=1}^{|B|} I(x_i \geq l_1) \leq a \leq |B|$$

Quantize the lengths to match that of the transport block size (TBS):

$$\tilde{x} = Q(x) \quad \text{Equation 2}$$

Obtain the effective SINR with the new quantized lengths:

$$SNR_c = g(\tilde{x}, SINR_1, \ldots SINR_{|B|}) \quad \text{Equation 3}$$

The effective SINR should satisfy the following conditions for transition from one coordinated transmission mode to another coordinated transmission mode:

Complete code word by the BS: $SINR_C \leq T1$.
Partial code word by some BS and complete code word by the other BS: $T1 < SINR_C \leq T2$.
Partial code word by all BS: $T2 \leq SINR_C \leq T3$.
Complete code word by the BS: $SINR_C > T3$.

The timer values for the transition of the UE from one coordinated transmission mode to another coordinated transmission mode should satisfy the conditions which are described in conjunction with the FIG. 2.

In an embodiment, the conditions for each of the coordinated transmission modes (i.e., X1, X2, X3, and X4) are described below. Here, the BS1 can be BS 104 and the BS2 can be BS 106.

$S_{12}$: $SINR_i < T1 \forall i \in B_1$ $T1 \leq SINR_j \leq T2 \forall j \in B_2$ $B = B_1 \cup B_2$ $B_1 \cap B_2 = \emptyset$ $S_{21}$: $SINR_i < T1 - \Delta_{21} \forall i \in B$ $S_{31}$: $SINR_i < T1 - \Delta_{31} \forall i \in B$ $S_{13}$: $T2 < SINR_i < T3 \forall i \in B$ $S_{24}$: $SINR_i > T3 + \Delta_{24}$ for at least one BS (say $i$)

$S_{42}$: $T1 < SINR_i < T2 - \Delta_{42} \forall i \in B_1$ $T1 \leq SINR_i < T3 \forall j \in B_2$ $B = B_1 \cup B_2$ $B_1 \cap B_2 = \emptyset$ $S_{43}$: $T2 < SINR_i < T3 - \Delta_{43} \forall i \in B$ $S_{34}$: $SINR_i > T3$ for at least one BS (say, $i$)

$S_{14}$: $SINR_i > T3 + \Delta_{14}$ for at least one BS (say, $i$)

$S_{41}$: $SINR_i < T1 - \Delta_{41} \forall i \in B$ $S_{23}$: $SINR_i < T2 \leq T3 \forall i \in B$ $S_{32}$: $SINR_i < T2 - \Delta_{32} \forall i \in B$ $T2 - \Delta_{32} < SINR_j \leq T3 \forall j \in B$ $B = B_1 \cup B_2$ $B_1 \cap B_2 = \emptyset$ Equation 4 where:

$S_{12}$ indicates UE transition from the first coordinated transmission mode "X1" to the second coordinated transmission mode "X2" and $S_{21}$ indicates UE transition from the second coordinated transmission mode "X2" to the first coordinated transmission mode "X1".

$S_{13}$ indicates UE transition from the first coordinated transmission mode "X1" to the third coordinated transmission mode "X3" and $S_{31}$ indicates UE transition from the third coordinated transmission mode "X3" to the first coordinated transmission mode "X1".

$S_{14}$ indicates UE transition from the first coordinated transmission mode "X1" to the fourth coordinated transmission mode "X4" and $S_{41}$ indicates UE transition from the fourth coordinated transmission mode "X4" to the first coordinated transmission mode "X1".

$S_{23}$ indicates UE transition from the second coordinated transmission mode "X2" to the third coordinated transmission mode "X3" and $S_{32}$ indicates UE transition from the third coordinated transmission mode "X3" to the second coordinated transmission mode "X2".

$S_{24}$ indicates UE transition from the second coordinated transmission mode "X2" to the fourth coordinated transmission mode "X4" and $S_{42}$ indicates UE transition from the fourth coordinated transmission mode "X4" to the second coordinated transmission mode "X2".

$S_{34}$ indicates UE transition from the third coordinated transmission mode "X3" to the fourth coordinated transmission mode "X4" and $S_{43}$ indicates UE transition from the fourth coordinated transmission mode "X4" to the third coordinated transmission mode "X3".

In another embodiment, the average SINR is computed which is required to determine the coordinated transmission mode. For every sub-band (or entire band) that is to be allocated to the UE, the SINR across the reference symbols of the past N1 sub-frames (or minimum time-frequency unit of scheduling) spaced N2 sub-frames apart is taken into consideration. The average SINRi is computed as follows:

(a) For UE speeds below v1 m/s, a sample average is taken by $$SINR_i = \left(\frac{1}{N_1 W_1}\right) \sum_{t=0}^{W_I} SINR(i - N_2 t) \qquad \text{Equation 5}$$

where "I" indicates the index of the sub-frame, i−N2*a>0, where 1<a<W.

For the UE speeds between v1 and v2 m/s, if the coefficient of variation (ratio of standard deviation to mean) of the SINR samples (that are used in the summation in Eq. 1 above) is below a threshold value (i.e., coordinated transmission threshold criteria) t1, then the sample mean of the SINR is calculated as shown in Eq. 1 above. Otherwise, the median of the samples is reported.

For speeds above v2 m/s, one of the following options can be chosen:

Minimum SINR from the samples as shown in Eq. 1 above.

In an embodiment, the effective SINR has to satisfy the value for a time period as given by the timer values as described in the Paragraph 0026. Here, the single value of the timer in the LTE will become a set of values of the timer depending on the BS in the transmission set and the signal strength at the UE from each of the BS in the transmission set.

In an embodiment, if the signal strength decreases below a threshold Qout, the UE is the to enter a Radio Link Failure State (RLF). A single counter is used to count the number of RLF measurements. If the number of counts is satisfied, the UE has to initiate RRC Connection Re-establishment procedure. For the case of partial transmission of information, only if the RLF condition is satisfied from all BSs in the transmission set, the RLF is declared. Further, if there is "k" BSs in the transmission set, there are k different counters for, determining the RLF, each counter corresponding to the number of BSs that can actively transmit. Accordingly, there will be "k" thresholds for RLF. Only if the RLF condition is satisfied for the "k" thresholds using the corresponding counters, RLF is declared.

In another embodiment, the HO method can be executed at the UE or can be executed at the BS, if the BS has adequate information. The UE estimates the effective received SINR from each BS to which it is connected during joint transmission.

In another embodiment of the disclosure, all the $\Delta k$ (k=1 to 7) can have the same values, possibly 0 too. The thresholds are for the SINR values averaged over suitable time or frequency. The decision for transition of the UE can be taken without consideration of the effective SINR. The time duration to check the signal strengths can be configured by the network or can be selected by the UE.

Unlike conventional systems, the partial information transmission wherein one of the BS (i.e., either BS 104 or BS 106) can transmit only a portion of the code word for the UE 102 (possibly, even a function of the code word) and other BSs can transmit the complete code word and the partial to complete code word transmission by other BS are functions of the signal conditions reported by the UE 102. The ping-pong effect of the soft-handover can be reduced and also decrease the number of resources used due to partial information transmission on the links is achieved.

Figure 6:
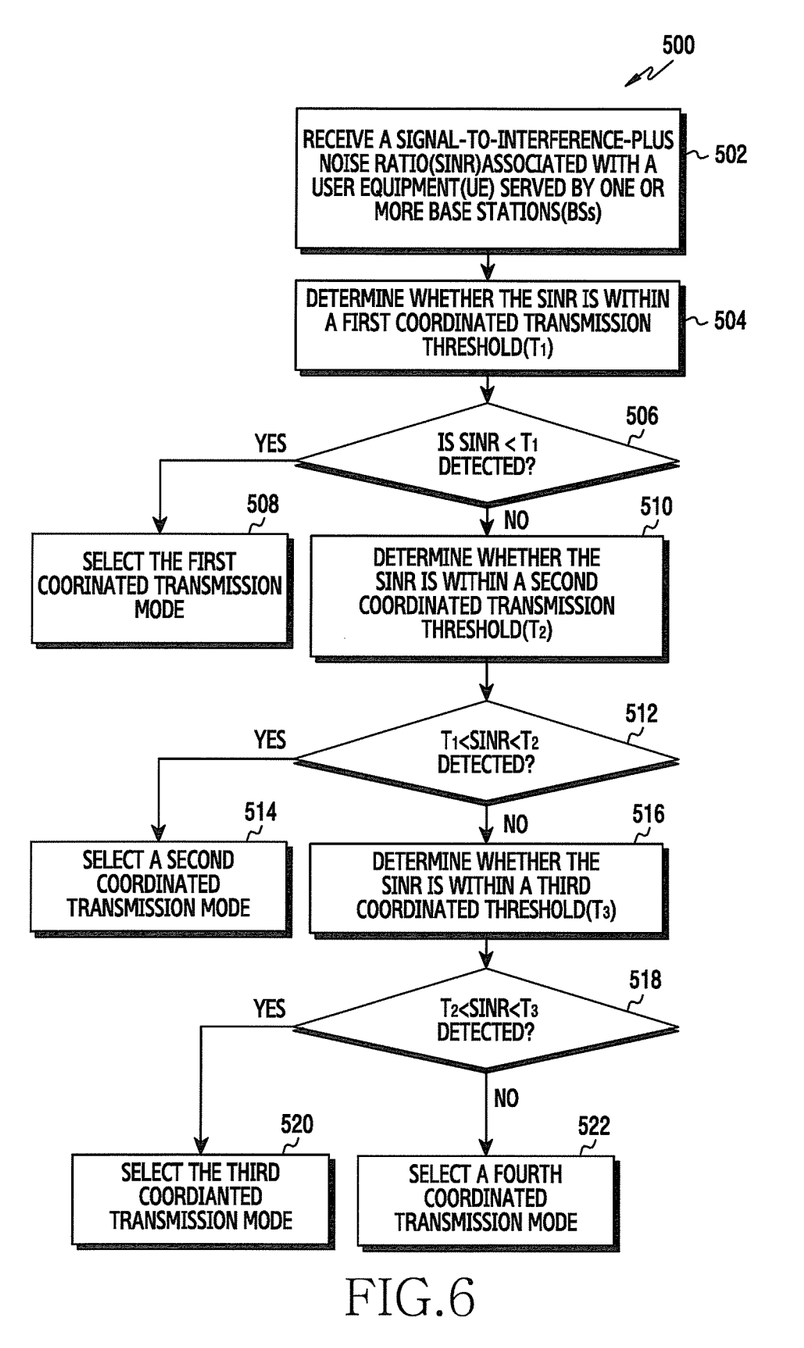
FIG. 6 is a flow diagram illustrating a method for controlling transmission of code words during handover or otherwise in a wireless network, according to embodiments as disclosed herein.

FIG. 6 is a flow diagram illustrating a method 500 for controlling transmission of code words during handover or otherwise in a wireless network, according to embodiments as disclosed herein. At step 502, the method 500 includes receiving a SINR associated with the UE served by one or more base stations (BSs). The BSs can be associated with a plurality of coordinated transmission modes indicating whether the BSs transmit a complete code word or a partial code word to the UE based on transmission threshold criteria. The method 500 allows a controller module 304 in the BS to receive the SINR associated with the UE served the BSs. At step 504, the method 500 includes determining whether the SINR is within the first coordinated transmission threshold. The first coordinated transmission threshold criteria can be associated with a first coordinated transmission mode from the plurality of coordinated transmission modes. The method 500 allows the controller module 304 to determine whether the SINR is within the first coordinated transmission threshold.

If it is determined at step 506 that the SINR is within the first coordinated transmission threshold, then at step 508 the method 500 allows selecting the first coordinated transmission mode. The first coordinated transmission mode allows all the BSs to transmit the complete code word to the UE. The method 500 allows the controller module 304 to select the first coordinated transmission mode where all the BSs transmit complete code word to the UE. If it is determined at step 506 that the SINR exceeds the first coordinated transmission threshold, then at step 510 the method 500 includes determining whether the SINR is within the second coordinated transmission threshold. The second coordinated transmission threshold can be associated with a second coordinated transmission mode from the plurality of coordinated transmission modes. The method 500 allows the controller module 304 to determine whether the SINR is within the second coordinated transmission threshold. If it is determined at step 512 that the SINR is within the second coordinated transmission threshold and exceeds the first coordinated transmission threshold, then at step 514 the method 500 includes selecting a second coordinated transmission mode. The second coordinated transmission mode allows some BSs to transmit the complete code word to the UE and some BSs to transmit the partial code word to the UE. The method 500 allows the controller module 304 to select the second coordinated transmission mode which allows some BSs to transmit the complete code word to the UE and some BSs to transmit the partial code word to the UE.

If it is determined at step 512 that the SINR exceeds the second coordinated transmission threshold, then at step 516 the method 500 includes determining whether the SINR is within a third coordinated transmission threshold. The third coordinated transmission threshold can be associated with a third coordinated transmission mode from the plurality of coordinated transmission modes. The method 500 allows the controller module 304 to determine whether the SINR is within the third coordinated transmission threshold. If it is determined at step 518 that the SINR is within the third coordinated transmission threshold and exceeds the second coordinated transmission threshold, then at step 520 the method 500 includes selecting the third coordinated transmission mode. The third coordinated transmission mode allows all the BSs to transmit the partial code word to the UE. The method 500 allows the controller module 304 to select the third coordinated transmission mode which allows all the BSs to transmit the partial code word to the UE. If it is determined at step 518 that the SINR exceeds the third coordinated transmission threshold, then at step 522 the method includes selecting a fourth coordinated transmission mode. The fourth coordinated transmission mode allows only one BS to transmit the complete code word to the UE. The method 500 allows the controller module 304 to select the fourth coordinated transmission mode allowing only one BS to transmit the complete code word to the UE. In an embodiment, the UE can be configured to maintain a set of timer values and the RLF counters at the BS for the handover based on the selected coordinated transmission mode.

The various actions, acts, blocks, steps, and the like in method 500 can be performed in the order presented, in a different order or simultaneously. Further, in some embodiments, some actions, acts, blocks, steps, and the like may be omitted, added, modified, skipped, and the like without departing from the scope of the disclosure.

The embodiments disclosed herein can be implemented through at least one software program running on at least one hardware device and performing network management functions to control the elements. The elements shown in FIGS. 2 and 3 include blocks which can be at least one of a hardware device, or a combination of hardware device and software module.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a base station in a wireless network, the method comprising:
   receiving channel quality information related to a terminal served by at least one base station;
   determining at least one coordinated transmission mode based on a coordinated transmission threshold criteria and the channel quality information; and
   transmitting a complete codeword or a partial codeword according to the at least one coordinated transmission mode during handover of the terminal,
   wherein the at least one coordinated transmission mode is a mode for transmitting the complete codeword or the partial codeword.

2. The method of claim 1, The method of claim 1, wherein determining the at least one coordinated transmission mode comprises:
   determining whether the channel quality information is within a first threshold value; and
   selecting a first coordinated transmission mode according to the determination of whether the channel quality information is within the first threshold value,
   wherein the first threshold value is related to the first coordinated transmission mode in a plurality of coordinated transmission modes and the first coordinated transmission mode corresponds to a mode in which each base station transmits the complete codeword to the terminal.

3. The method of claim 2, wherein determining the at least one coordinated transmission mode comprises:
   determining whether the channel quality information is within a second threshold value, according to the determination of whether the channel quality information exceeds the first threshold value; and
   selecting a second coordinated transmission mode according to the determination of whether the channel quality information is within the second threshold value,
   wherein the second threshold value is related to the second coordinated transmission mode in the plurality of coordinated transmission modes and the second coordinated transmission mode corresponds to a mode in which at least one base station transmits the complete codeword to the terminal and at least one base station transmits the partial codeword to the terminal.

4. The method of claim 3, wherein determining the at least one coordinated transmission mode comprises:
   determining whether the channel quality information is within a third threshold value according to the determination of whether the channel quality information exceeds the second threshold value; and
   selecting a third coordinated transmission mode according to the determination of whether the channel quality information is within the third threshold value,
   wherein the third threshold value is related to the third coordinated transmission mode in the plurality of coordinated transmission modes and the third coordinated transmission mode corresponds to a mode in which all base stations transmit the partial codeword to the terminal.

5. The method of claim 4, wherein determining the at least one coordinated transmission mode comprises selecting a fourth coordinated transmission mode according to the determination of whether the channel quality information exceeds the third threshold value,
   wherein the fourth coordinated transmission mode corresponds to a mode in which only one base station transmits the complete codeword to the terminal.

6. The method of claim 1, further comprising:
   maintaining one value among a set of timer values and a radio link failure (RLF) counter for the handover on the basis of the coordinated transmission mode.

7. The method of claim 1, wherein the coordinated transmission threshold criteria comprises a time criteria.

8. A method for operating a terminal in a wireless network, the method comprising:

transmitting channel quality information related to the terminal served by a plurality of base stations; and receiving a complete codeword or a partial codeword according to at least one coordinated transmission mode during handover, wherein the at least one coordinated transmission mode is determined based on a coordinated transmission threshold criteria and the channel quality information, and wherein the at least one coordinated transmission mode is a mode for transmitting the complete codeword or the partial codeword.

9. The method of claim 8, wherein the at least one coordinated transmission mode comprises at least one mode among:

a first mode in which each of the plurality of base stations transmits the complete codeword to the terminal;

a second mode in which a part of the plurality of base stations transmits the complete codeword to the terminal and remaining base stations transmit the partial codeword to the terminal;

a third mode in which the plurality of base stations transmit the partial codeword to the terminal; and a fourth mode in which one base station among the plurality of base stations transmits the complete codeword to the terminal.

10. An apparatus in a wireless network, the apparatus comprising:

at least one transceiver; and at least one processor operatively coupled with the at least one transceiver, wherein the at least one processor is configured to control to:

receive channel quality information related to a terminal served by at least one base station;

determine at least one coordinated transmission mode based on a coordinated transmission threshold criteria and the channel quality information; and transmit a complete codeword or a partial codeword according to the at least one coordinated transmission mode during handover of the terminal, wherein the at least one coordinated transmission mode is a mode for transmitting the complete codeword or the partial codeword.

11. The apparatus of claim 10, wherein the at least one processor is configured to control to determine whether the channel quality information is within a first threshold value, and select a first coordinated transmission mode according to the determination of whether the channel quality information is within the first threshold value, wherein the first threshold value is related to the first coordinated transmission mode in a plurality of coordinated transmission modes and the first coordinated transmission mode corresponds to a mode in which each base station transmits the complete codeword to the terminal.

12. The apparatus of claim 11, wherein the at least one processor is configured to control to determine whether the channel quality information is within a second threshold value, according to the determination of whether the channel quality information exceeds the first threshold value, and select a second coordinated transmission mode according to the determination of whether the channel quality information is within the second threshold value, wherein the second threshold value is related to the second coordinated transmission mode in the plurality of coordinated transmission modes and the second coordinated transmission mode corresponds to a mode in which at least one base station is configured to transmit the complete codeword to the terminal and at least one base station transmits the partial codeword to the terminal.

13. The apparatus of claim 12, wherein the at least one processor is configured to control to determine whether the channel quality information is within a third threshold value according to the determination of whether the channel quality information exceeds the second threshold value, and select a third coordinated transmission mode according to the determination of whether the channel quality information is within the third threshold value, wherein the third threshold value is related to the third coordinated transmission mode in the plurality of coordinated transmission modes and the third coordinated transmission mode corresponds to a mode in which all base stations transmit the partial codeword to the terminal.

14. The apparatus of claim 13, wherein the at least one processor is configured to control to select a fourth coordinated transmission mode according to the determination of whether the channel quality information exceeds the third threshold value, wherein the fourth coordinated transmission mode corresponds to a mode in which only one base station transmits the complete codeword to the terminal.

15. The apparatus of claim 10, wherein one value among a set of timer vales and a radio link failure (RLF) counter are maintained for the handover on the basis of the coordinated transmission mode.

16. The apparatus of claim 10, wherein the coordinated transmission threshold criteria comprises a time criteria.

17. An apparatus of a terminal in a wireless network, the apparatus comprising:

at least one transceiver; and at least one processor operatively coupled with the at least one transceiver, wherein the at least one processor is configured to control to:

transmit channel quality information related to the terminal served by a plurality of base stations; and receive a complete codeword or a partial codeword according to at least one coordinated transmission mode during handover, wherein, the at least one coordinated transmission mode is determined based on a coordinated transmission threshold criteria and the channel quality information, and wherein the at least one coordinated transmission mode is a mode for transmitting the complete codeword or the partial codeword.

18. The apparatus of claim 17, wherein the at least one coordinated transmission mode comprises at least one mode among:

a first mode in which each of the plurality of base stations is configured to transmit the complete codeword to the terminal;

a second mode in which a part of the plurality of base stations is configured to transmit the complete codeword to the terminal and the remaining base stations transmit the partial codeword to the terminal;

a third mode in which the plurality of base stations is configured to transmit the partial codeword to the terminal; and a fourth mode in which one base station among the plurality of base stations is configured to transmit the complete codeword to the terminal.

19. The apparatus of claim 17, wherein one value among a set of timer values and a radio link failure (RLF) counter are maintained for the handover on the basis of the at least one coordinated transmission mode.

20. The apparatus of claim 17, wherein the coordinated transmission threshold criteria comprises a time criteria.

* * * * *